(12) United States Patent
Nettesheim et al.

(10) Patent No.: US 8,439,269 B2
(45) Date of Patent: May 14, 2013

(54) PERSONALIZED RELEASE CARD

(75) Inventors: Keith R. Nettesheim, Chenequa, WI (US); Mark A. Scroggins, Pembroke, MA (US)

(73) Assignee: Quad/Graphics, Inc., Sussex, WI (US)

( * ) Notice: Subject to any disclaimer, the term of this patent is extended or adjusted under 35 U.S.C. 154(b) by 407 days.

(21) Appl. No.: 12/410,068

(22) Filed: Mar. 24, 2009

(65) Prior Publication Data

US 2010/0243746 A1 Sep. 30, 2010

(51) Int. Cl.
*G06K 19/02* (2006.01)

(52) U.S. Cl.
USPC .................... 235/488; 235/383; 235/494

(58) Field of Classification Search .......... 235/375, 235/380, 487, 488, 383, 449, 493, 462.01, 235/494; 428/40.1, 41.8, 42.2, 42.3, 43
See application file for complete search history.

(56) References Cited

U.S. PATENT DOCUMENTS

| | | | | |
|---|---|---|---|---|
| 3,854,229 A | * | 12/1974 | Morgan | 40/638 |
| 4,307,900 A | * | 12/1981 | Krautsack | 283/56 |
| 5,413,384 A | * | 5/1995 | Principe et al. | 283/81 |
| 5,439,721 A | * | 8/1995 | Pedroli et al. | 428/42.1 |
| 5,704,650 A | * | 1/1998 | Laurash et al. | 283/81 |
| 5,782,497 A | * | 7/1998 | Casagrande | 283/110 |
| 5,921,584 A | * | 7/1999 | Goade, Sr. | 283/107 |
| 6,010,159 A | * | 1/2000 | Warther | 283/61 |
| 6,302,388 B1 | | 10/2001 | Graushar et al. | |
| 6,749,229 B2 | | 6/2004 | Kennedy | |
| 2003/0049404 A1 | * | 3/2003 | Mercer et al. | 428/42.3 |
| 2003/0070338 A1 | * | 4/2003 | Roshkoff | 40/638 |
| 2003/0178495 A1 | * | 9/2003 | Jones et al. | 235/492 |
| 2006/0125168 A1 | | 6/2006 | Romita et al. | |
| 2006/0125169 A1 | | 6/2006 | Romita et al. | |
| 2006/0125170 A1 | | 6/2006 | Romita et al. | |
| 2006/0213635 A1 | | 9/2006 | Deschryver | |
| 2007/0163703 A1 | | 7/2007 | Romita | |
| 2008/0077488 A1 | * | 3/2008 | Main et al. | 705/14 |
| 2010/0049598 A1 | * | 2/2010 | Burst et al. | 705/14.1 |
| 2011/0025037 A1 | * | 2/2011 | Wilen | 283/56 |

* cited by examiner

*Primary Examiner* — Tuyen K Vo
(74) *Attorney, Agent, or Firm* — Michael Best & Friedrich LLP (57) ABSTRACT

A method includes applying coded personal information for an individual on a rear surface of a card, printing personal information for the individual on a printed product, and adhering the rear surface of the card to an exterior surface of the printed product. The printed product can be mailed without protective packaging covering the card.

21 Claims, 9 Drawing Sheets

PERSONALIZED RELEASE CARD

BACKGROUND

A card is disclosed that is able to adhere to a printed product, and in particular, a card that includes coded personal information for an individual.

Cards (e.g., credit or gift cards) generally can be categorized into two groups: non-personalized and personalized. Non-personalized cards do not contain any information associated with the intended recipient or addressee. The card can include standard printed information such as advertising information on the front and back as well as a generic bar code (typically on the back). The bar code can be read at the retailer to identify discount information, promotion type, and possibly a printed product (e.g., magazine title) with which the card was associated. This information can be used by the retailer to track the success of various promotions. A personalized card can include all the information of the non-personalized card, but also can include personal or non-generic information (e.g., coded personal information embedded in a bar code that is representative of personal information) such as an addressee's address, preferences, income level, buying habits, etc.

One type of card is a "clean release" card. Clean release cards are adhered to printed products such that, when removed by the recipient, a two-sided adhesive layer remains affixed to the printed product so that the back side of the card is not tacky (i.e., "clean"). Clean release cards are supplied on a paper backing layer along with a two-sided adhesive layer. When a clean release card is removed from the backing layer, the two-sided adhesive comes off of the backing layer with the card so that the exposed side of the two-sided adhesive layer can be adhered to a publication. Clean release cards are traditionally adhered to an interior page within the publication. Traditionally, clean release cards do not include personalized information on the back of the card (i.e., the paper backing prevents access to the back of the card from the time of manufacturing up until the time that the card is removed from the paper backing to be adhered to a printed product).

A common type of removable card used when personalized information must be printed on the back is a tip-on card. Tip-on cards are affixed to the printed products by a spot gluing process using a tipper or pick-n-place device. This process adheres the tip-on card to the printed products using releasable glue, but it does not firmly hold the edges of the tip-on card against the printed product making it unsuitable for being applied to the cover (or exposed surface) of a printed product as any loose corner may cause interference and jamming in mailing operations and/or premature release of the tip-on card. In order for personalized tip-on cards to be spot glued on the cover of a printed product and be acceptable for mailing, the printed product must be placed in a poly bag, envelope, or poly or paper wrapping, which adds handling time and expense.

SUMMARY

Provided is a method of personalizing a clean release card and adhering the clean release card to a printed product. The method comprises applying coded personal information for an individual on a rear surface of the clean release card, printing personal information for the individual on the printed product, and adhering the rear surface of the clean release card to the printed product.

Further provided is a method comprising printing coded personal information for an individual on a rear surface of a card, printing personal information for the individual on a printed product, and adhering the rear surface of the card to an exterior surface of the printed product. The method may further comprise mailing the printed product without protective packaging covering the card.

Further provided is a method of associating cards of a stream of unique cards to printed products of a stream of printed products on one of a printing line and a finishing line. The method comprises providing a stream of unique cards on one of a printing line and a finishing line, each card of the stream of unique cards including information on a rear surface thereof that corresponds to personal information specific to an intended recipient of a corresponding one of the printed products. The rear surface of each of the cards of the stream of unique cards is releasably adhered to a common backing material. The backing material and the stream of unique cards are conveyed toward the stream of printed products. A first card of the stream of unique cards is separated from the backing material, and the first card of the stream of unique cards is adhered to a corresponding printed product of the stream of printed products.

Further provided is a method of associating a card to a printed product. The method includes providing a printed product, and providing a card adhered to a backing material, one of the card and the backing material having a personal code printed thereon, the personal code corresponding to personal information specific to an intended recipient. The personal code is scanned, and the card is adhered to the printed product. The personal code can be printed on a back side of the card and scanned through the backing material. Alternately, the personal code can be printed on the backing material. The personal code can be associated with the personal information before or after the personal code is scanned.

Further provided is a method of manufacturing a plurality of cards releasably adhered to a common backing material to enable post-production customization. The method comprises printing generic information on a front surface of each of a plurality of cards, releasably adhering a back surface of each of the plurality of cards to a common backing material with an adhesive layer, such that an aperture in each adhesive layer is aligned with one of a plurality of apertures in the common backing material to define a printable area on the back surface of each of the plurality of cards that is exposed from the back of the common backing material when the plurality of cards are adhered to the common backing material. The method may further comprise forming the aperture in each adhesive layer and/or the plurality of apertures in the common backing material by die cutting.

Further provided is a strip including a plurality of customizable cards releasably adhered to a common backing material to enable post-production customization of each of the cards. Each of the plurality of cards includes generic information printed on a front surface thereof. A back surface of each of the plurality of cards is releasably adhered to a common backing material with a respective adhesive layer. An aperture is formed in each respective adhesive layer. A plurality of apertures are formed in the common backing material. The aperture of each respective adhesive layer is aligned with one of the plurality of apertures in the common backing material to define a printable area on the back of each of the plurality of cards that is exposed from the back of the common backing material when the plurality of cards are adhered to the common backing material.

Further provided is a strip including a plurality of customized cards releasably adhered to a common backing material to enable post-production identification of each of the customized cards. Each of the plurality of customized cards includes generic information printed on a front surface thereof. A back surface of each of the plurality of customized cards includes unique information and is releasably adhered to a common backing material with a respective adhesive layer. The common backing material is transparent such that the unique information on the back surface of each of the plurality of customized cards is readable through the common backing material.

Further provided is a strip including a plurality of customized cards releasably adhered to a common backing material to enable post-production identification of each of the customized cards. Each of the plurality of customized cards includes generic information printed on a front surface thereof. A back surface of each of the plurality of customized cards includes unique information and is releasably adhered to a common backing material with a respective adhesive layer. The common backing material includes an identification portion adjacent each of the customized cards. The identification portion displays the unique information that is on the back surface of the adjacently adhered customized card so that the unique information is readable when the plurality of customized cards are adhered to the common backing material.

Further provided is a card and backing assembly including a card, a backing to which a rear side of the card is adhered with an adhesive layer, the backing having a die cut aperture therein to expose a portion of the rear side of the card. The aperture may expose information on the portion of the rear side of the card, or expose the portion for information to be applied thereto while the card is adhered to the backing.

Further provided is a card and backing assembly including a card having a front side and a rear side having information thereon. The assembly further includes a backing to which the rear side of the card is adhered with an adhesive layer. The backing and the adhesive layer are transparent so that the information on the rear side of the card is readable from the rear side of the card while the card is adhered to the backing.

Further provided is a card and backing assembly including a card having a front side and a rear side having information thereon. The assembly further includes a backing having a front side to which the rear side of the card is adhered. The backing includes a portion adjacent the adhered card displaying information corresponding to the information on the rear side of the card. The information on the portion of the backing may be readable from the front side of the backing to convey the information from the rear side of the card while the card is adhered to the backing.

Further provided is a method of associating cards of a stream of cards to printed products of a stream of printed products on one of a printing line and a finishing line. The method comprises conveying a stream of cards to a stream of printed products on one of a printing line and a finishing line, each card comprising an identifier on a surface thereof that is not associated with an intended recipient. The method further comprises associating the identifier of at least one card with an intended recipient of a corresponding one of the printed products, and adhering the at least one card to the corresponding printed product of the stream of printed products.

Other aspects will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
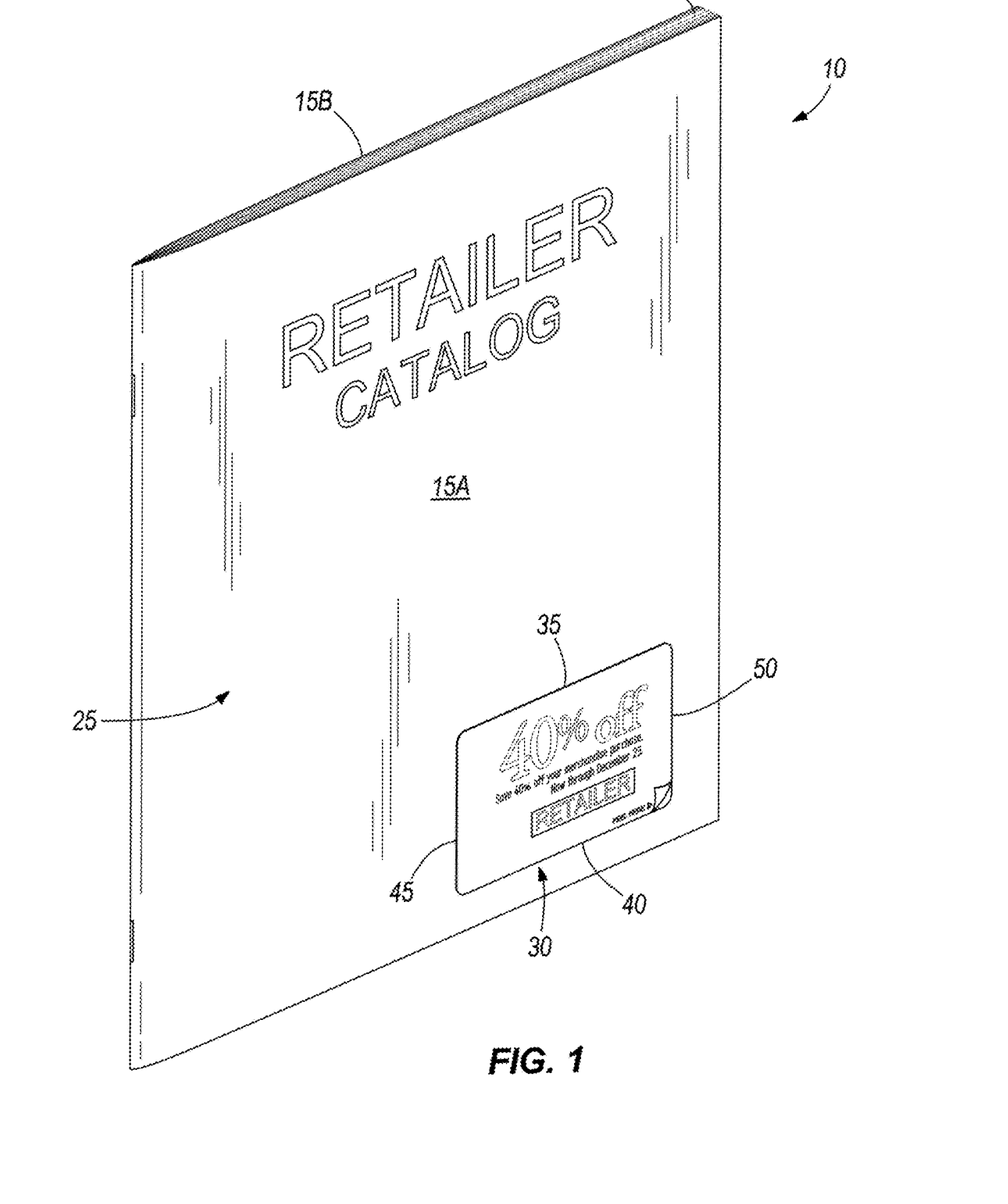
FIG. 1 is a perspective view of a printed product including a releasably adhered card according to an embodiment of the present invention.

FIG. 1 shows a printed product 10 that is suitable for mailing to a recipient (e.g., an individual or a group). In one embodiment, the illustrated printed product 10 may be a catalog. However, the printed product 10 may be any printed product such as a magazine, brochure, pamphlet, post card, periodical, book, or anything suitable for direct mailing. The printed product 10 includes a cover 15 folded in half to define a front cover 15A and a back cover 15B. In other constructions, the front and back covers 15A, 15B may be two separate covers bound together. Pages 20 of the printed product 10 are positioned between the front and back covers 15A, 15B; however, the printed product 10 may have no pages in other embodiments. Each cover 15A, 15B includes an interior surface proximate the pages 20 of the printed product 10 and an exterior surface 25 opposite the interior surface.

With continued reference to FIG. 1, a card 30 may be releasably adhered to the exterior surface 25 of the front cover 15A of the printed product 10. In other constructions, the card 30 can be releasably adhered to the exterior surface 25 of the back cover 15B or in other locations throughout the printed product 10. In the illustrated construction, the card 30 is a clean release card, although in other constructions, the card 30 could be another type of card such as a tip-on card.

Figure 2:
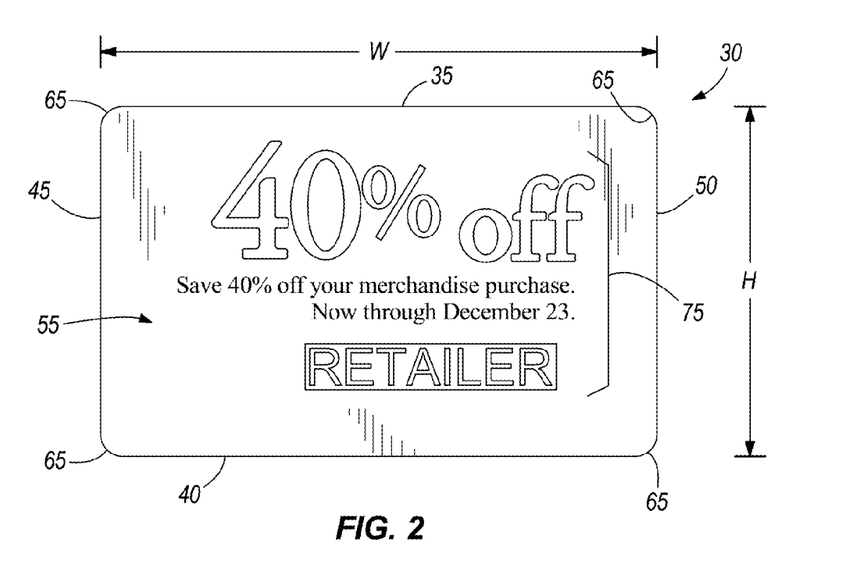
FIG. 2 is a front view of the card shown in FIG. 1.
Figure 3:
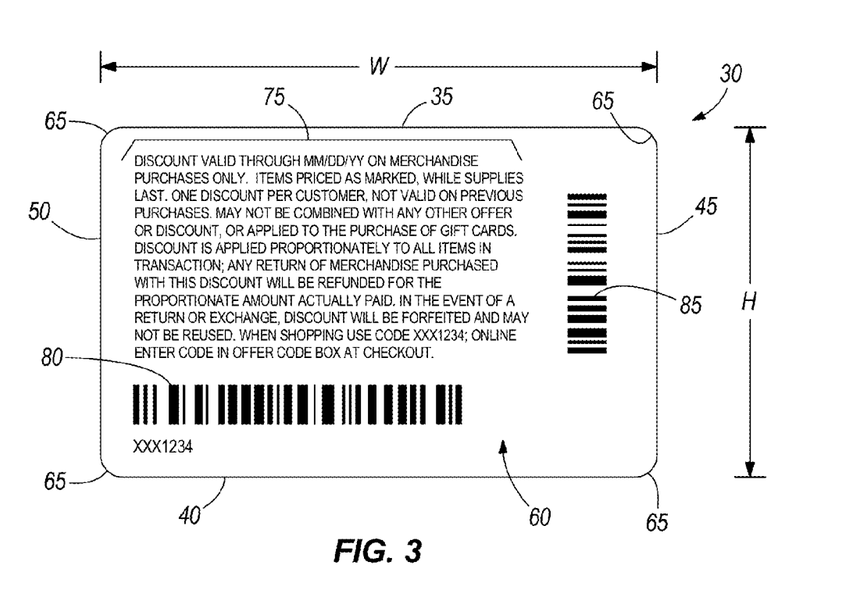
FIG. 3 is a rear view of the card shown in FIG. 1.

FIGS. 2 and 3 show that the card 30 may include a top edge 35, a bottom edge 40 opposite the top edge 35, and side edges 45, 50 extending between the top and bottom edges 35, 40 to define a substantially rectangular-shaped card 30. However, the card 30 may be of any shape. The card 30 includes a front surface 55 and a rear surface 60 opposite the front surface 55. Corners 65 formed by the adjacent edges of the card 30 may be rounded or square.

In one embodiment, the card 30 has a width "W" of approximately 3 inches (e.g., 3.375 inches) and a height "H" of approximately 2 inches (e.g., 2.175 inches). However, the card 30 may be of any desired dimensions. The card 30 may be made of C2S paper that has a white color, a thickness of approximately 8.5 pt, and a glossy finish. However, the card 30 may be made of various types of polymers, papers, or any substrate which can be printed upon.

In some constructions, the card 30 is a credit card, gift card, or any card that an addressee (e.g., the recipient) may receive through mail or on a printed product. In other constructions, the card 30 may be a retailer card of the same or different thickness than a standard credit card or gift card. The card 30 may or may not also include a magnetic strip on the rear surface 60. The retailer can provide many similar cards 30 to many different recipients.

Cards 30 provided to a recipient can include retailer advertising information 75 on the front and/or rear surface 55, 60, some or all of which can be generic to all of the cards 30. Examples of the retailer advertising information 75 include discount information, promotion information, terms and conditions, and/or name of the retailer. The illustrated retailer advertising information 75 can be printed or otherwise applied as text on the front surface 55 (FIG. 2) and the rear surface 60 (FIG. 3). The front surface 55 may describe a discount offered by the retailer for the particular recipient of the printed product 10. The rear surface 60 (FIG. 3) may include the terms and conditions relating to the discount printed on the front surface 55.

With reference to FIG. 3, retailer information may also be printed or otherwise applied on the rear surface 60 as machine readable indicia such as a bar code 80. The bar code 80 can be positioned proximate the bottom edge 40, however, it could be located elsewhere on the release card 30. The retailer information coded in the bar code 80 may be associated with the retailer advertising information 75 on the front and/or rear surface 55, 60 of the card 30 and may be generic to the intended recipient (i.e., containing no personal information related to the specific intended recipient). The bar code 80 can be readable by a retailer and may be associated with particular information saved or coded by the retailer (e.g., discount information, promotion type, or printed product information (e.g., title)). The retailer can scan the bar code 80 to track the advertising success of the printed product 10 and the card 30 adhered thereto. In some embodiments, the initiating promoter of the cards 30 is an entity other than a retailer.

With continued reference to FIG. 3, the card 30 may be customized or personalized. This customization may include any non-generic information that varies from card-to-card such that a card 30 is unique among other cards 30 that share the same generic information (e.g., retailer information, discount offer, etc.). The non-generic information may be personalized for a particular individual (e.g., intended recipient) receiving the card 30 with the printed product 10. In one embodiment, to customize, machine readable indicia, such as a personal bar code 85, is printed or otherwise applied on the rear surface 60 of the card 30. Personal information related to the intended recipient may be represented by the personal bar code 85. The personal bar code 85 may be proximate the bottom edge 40, or one of the side edges 45. In other constructions, the personal bar code 85 can be positioned anywhere on either of the front surface 55 or the rear surface 60. The information coded by the personal bar code 85 is associated with personal information of the intended recipient. Personal information may include, for example, the individual's address, shopping habits, income level, and/or account number with the retailer. Accordingly, each personal bar code 85 is unique and trackable.

In other constructions, the information (e.g., retailer and personal information) in the generic bar code 80 and the personal bar code 85 are combined in a single bar code. The single bar code is unique for each individual or recipient of the card 30 and includes the information discussed above with reference to FIGS. 2 and 3.

Figure 4:
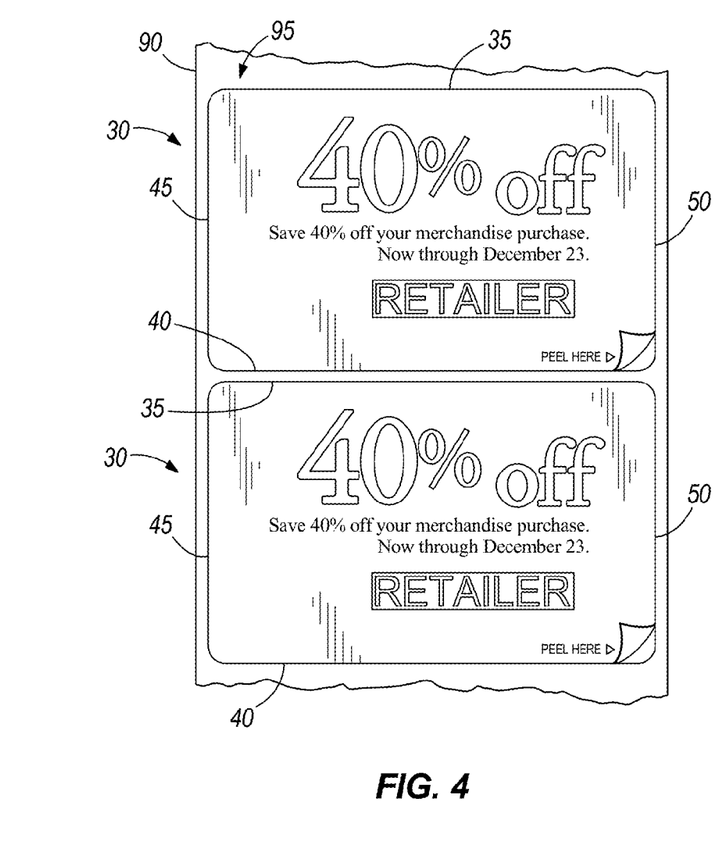
FIG. 4 is a front view of a plurality of the cards shown in FIG. 1, adhered to a backing material.
Figure 5:
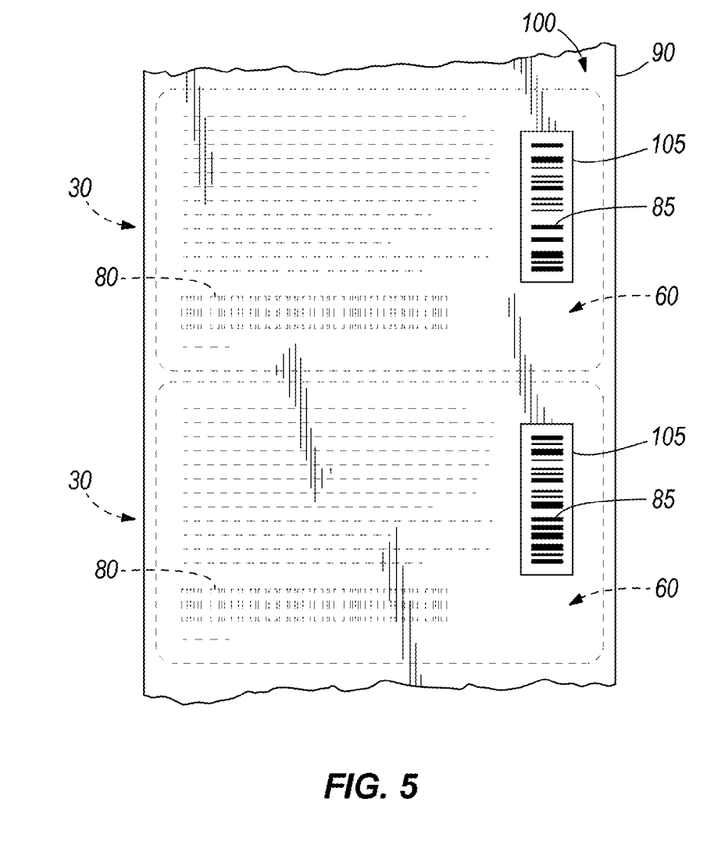
FIG. 5 is a rear view of the backing material shown in FIG. 4 illustrating a plurality of apertures.

FIGS. 4 and 5 show one embodiment of a strip including at least two cards 30 adhered to a common backing material or layer 90 (e.g., a paper or any flexible substrate). Each card 30 includes generic retailer advertising information 75 printed on the front surfaces 55. In addition, each card 30 can include generic text 75 and bar codes 80 printed or otherwise applied on the rear surfaces 60. As discussed above, each card 30 is customized with a personal bar code 85 on the rear surface that is unique for each recipient of the cards 30. In other embodiments, the cards 30 may include unique, non-generic information on the front, back, or both.

Figure 6:
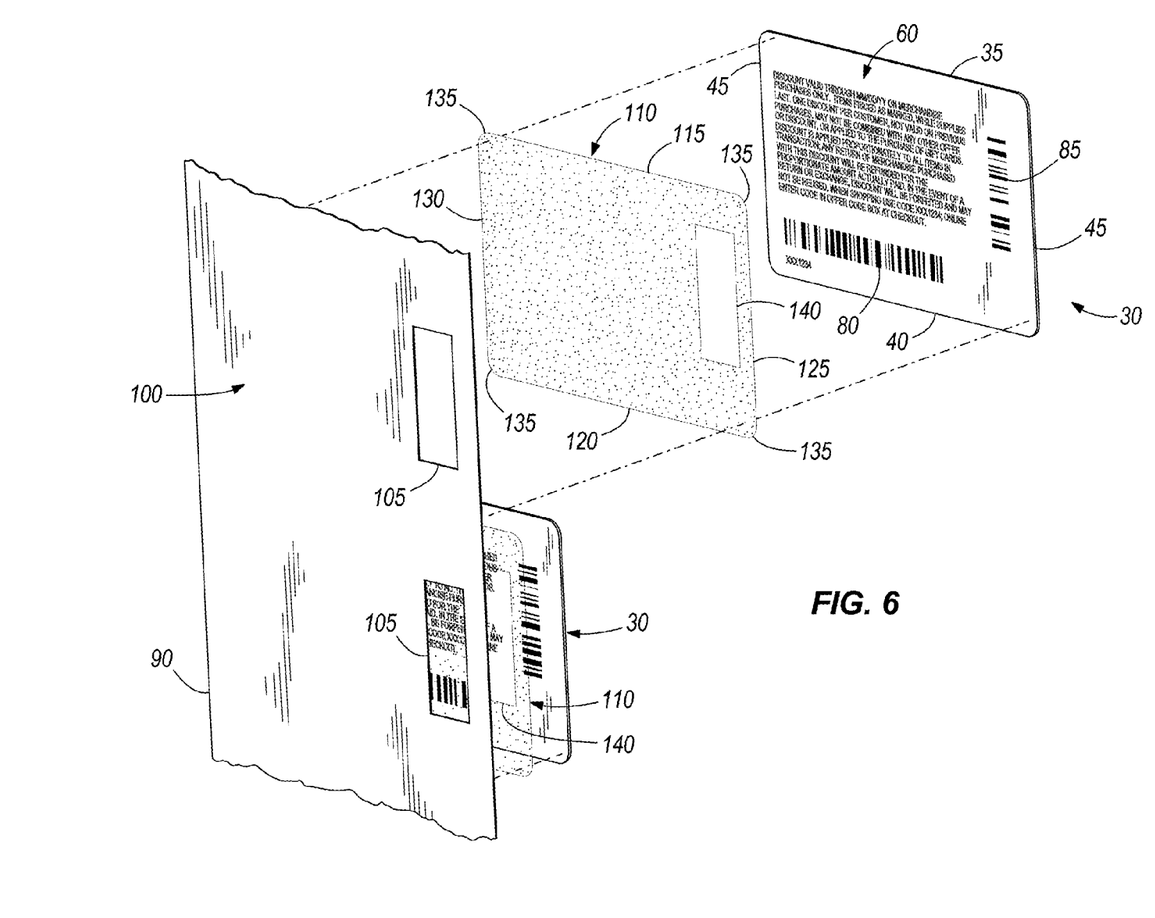
FIG. 6 is an exploded view of the plurality of the cards and the backing material shown in FIG. 4.

The backing material 90 includes a first surface 95 and a second surface 100. As shown in FIG. 6, each card 30 can be adhered to the first surface 95 of the backing material 95 with an individual transparent adhesive layer 110. The backing material 90 may be an opaque material, with a surface finish that permits the adhesive layers 110 to be adhered to the first surface 95 and then removed cleanly (i.e., when the cards 30 are removed from the backing material 90) such that the first surface 95 is "clean" or adhesive-free when the adhesive layers 110 are removed from the backing material 90. The cards 30 can also be later removed from their respective adhesive layers 110 with no adhesive left on the card 30. Thus, these cards are referred to as a "clean release" cards 30. The adhesive layer 110 can be any type of carrier material for affixing the card 30 to the printed product 10 and allowing the card 30 to be removed by the recipient. The adhesive layer can be formed from a film, liquid, aerosol, resin, etc. The adhesive layer 110 can include pressure-sensitive adhesive bonding materials, silicone with static cling properties, etc. In some embodiments, each side of the carrier material or adhesive layer 110 can have different physical or adhesive properties. For example, the carrier material can have a first adhesive property on one side of the carrier or adhesive layer 110, such as a non-releasable adhesive, and a second adhesive property on the other side, such as releasable adhesive. By having a carrier material with different physical characteristics, the card 30 can be releasably attached to one side of the carrier material or adhesive layer 110 so that when the card 30 is removed the carrier material exhibits a substantially non-tacky surface, yet the carrier material or adhesive layer can remain securely attached to a printed product 10 by, for example, a pressure-sensitive adhesive bonding material. The carrier material or adhesive layer 110 can releasably attach the card 30 to a first side of the carrier material by other means as well, including for example static cling.

An aperture 105 is formed in the backing material 90 for each of the cards 30 adhered thereto. Each adhesive layer 110 also includes an aperture 140. In the illustrated embodiment, the aperture 140 in each adhesive layer 110 has substantially similar dimensions to the apertures 105 in the backing material 90, although this is not required. The adhesive layer 110 may be positioned on or applied to the backing material 90 so that the aperture 140 permits direct contact to the card 30 or portions of the card 30 that are intended to be removed from the printed product from which it is to be associated. As shown in the illustrated embodiment, if a separate adhesive layer 110 with an aperture 140 is used, the aperture 140 in the adhesive layer can be substantially aligned with the aperture 105 in the backing material 90. Again, the apertures 105, 140 in the backing material 90 and the adhesive layers 110 are formed and positioned such that when the cards 30 are adhered to the backing material 90, an exposed area is defined on the rear surface 60 of each of the cards 30. The adhesive layer 110 can be formed without an aperture and cut to include the aperture 140 together with or separate from the formation of the aperture 105 in the backing material 90, or the adhesive layer 110 can be originally formed with the aperture 140 (e.g., with a spray-on adhesive that is strategically applied or appropriately masked to form the aperture 140). In some embodiments, the apertures 105, 140 in both the backing material 90 and the adhesive layer 110 can be formed by die cutting.

The exposed area defined by the aperture is positioned such that the personal bar code 85 can be printed or otherwise applied on the rear surface 60 of each card 30 after the cards 30 are adhered to the backing material 90. In some embodiments, the personal bar codes 85 are printed or otherwise applied on the cards 30 before they are adhered to the backing material 90, and the apertures 105, 140 in the backing material 90 and adhesive layers 110 allow the personal bar codes 85 to be viewed through the backing material 90 as described in further detail below.

In one embodiment, the adhesive layer 110 is provided to the card 30 and is dimensioned similar to the card 30 such that the adhesive layer 110 substantially covers the rear surface 60 of the card 30, except for the aperture. For example, the adhesive layer 110 shown is substantially rectangular shaped and includes a top edge 115, a bottom edge 120, and opposing side edges 125, 130 that are substantially aligned with the top edge 35, bottom edge 40 and opposing side edges 45, 50 of the card 30 when the adhesive layer 110 is affixed to the card 30. In addition, each corner 135 formed between adjacent edges of the adhesive layer 110 is similarly rounded. In other constructions, the adhesive layer 110 may have less surface area than the rear surface 60 of the card 30 such that the adhesive layer 110 does not substantially cover the rear surface 60 of the card 30. However, the edges of the adhesive layer 110 may maintain alignment with the edges of the card 30.

At least one method of applying the cards 30 to printed products is described below with reference to FIG. 12. Printed products 10 are printed and assembled with the cards 30 using a production applicator 180. The production applicator 180 is located in-line with a printing line or finishing line, and the adherence of the cards 30 occurs along the same line. In other embodiments, the cards 30 may be applied to the printed products 10 in an off-line process. The illustrated in-line production applicator 180 includes a first conveyor 185 for transporting a stream of the printed products 10, and a second conveyor 190 for conveying or feeding a stream of the cards 30 (FIGS. 1-6) toward the first conveyor 185.

In one embodiment, the cards 30 are created in bulk without the personal bar codes 85. The advertising information 75 and, optionally, the generic bar code 80 are printed or otherwise applied on each of the cards 30 such that the cards 30 are identical with respect to one another. As previously described, each of the cards 30 can be affixed to the first surface 95 of the backing material 90 by an adhesive layer 110. The backing material 90 can be supplied from a continuous substrate to receive a plurality of the cards 30 to form a continuous strip. In the illustrated in-line production applicator 180, the strip of cards 30 is configured into an accordion stack (or multiple stacks). The backing material 90 is folded in a zigzag pattern of rows. Each of the rows can include one or more of the cards 30. The rows are stacked one above another. In other embodiments, the cards 30 may be roll-fed, fan-folded, sheet fed, etc.

The strip of cards 30 can be supported inside a case 195 of the in-line production applicator 180. The second conveyor 190 draws the strip of cards 30 out of the stack(s) inside the case 195 to create a stream of cards 30 that is transported toward the stream of printed products 10 on the first conveyor 185. The stream of cards 30 is supplied by the folded, stacked backing material 90 having cards 30 adhered thereto. The cards 30 travel along the second conveyor 190 of the in-line production applicator 180. In the illustrated construction, the backing material 90 extends between multiple rollers (not shown) to form the second conveyor 190 (i.e., there is no separate conveyor belt or chain on which the backing material 90 rests). In other constructions, the second conveyor 190 includes a separate belt, chain, etc., such that the backing material 90 is supported and/or carried by the second conveyor 190 toward the first conveyor 185. The second conveyor 190 can be any type of card applicator, card feeder, or feeding device that can convey or feed the stream of cards 30.

The in-line production applicator 180 includes a printing apparatus 200 (e.g., an inkjet printer), a first sensor 215 and a second sensor 220 that are positioned along the second conveyor 190. A master control communicates with the in-line production applicator 180 (e.g., the printing apparatus 200, and the first and second sensors 215, 220), and controls the associating the cards 30 to the desired printed products 10.

Each of the printed products 10 is assigned to be delivered to a particular recipient. A database stores the delivery assignment and thereby associates or links the printed products 10 to the respective recipients. The master control tracks the position of the printed products 10 along the first conveyor 185 to monitor the location of the printed product with respect to the cards 30. In other words, the master control can use an encoder or the like to identify the locations of particular printed products 10. These printed products 10 may include printed information or other printed material based upon an individual's personalized information. Alternatively, the printed products 10 may include personalized information (such as recipient name and/or address) that is monitored by the master control.

The personal information (e.g., individual's address, shopping habits, income level, etc.) for each of the recipients is stored in the database. The master control stores and/or generates the personal bar codes 85 that represent the personal information stored in the database for each of the recipients. The personal bar codes 85 are unique for each of the recipients and are stored in the database.

Figure 12:
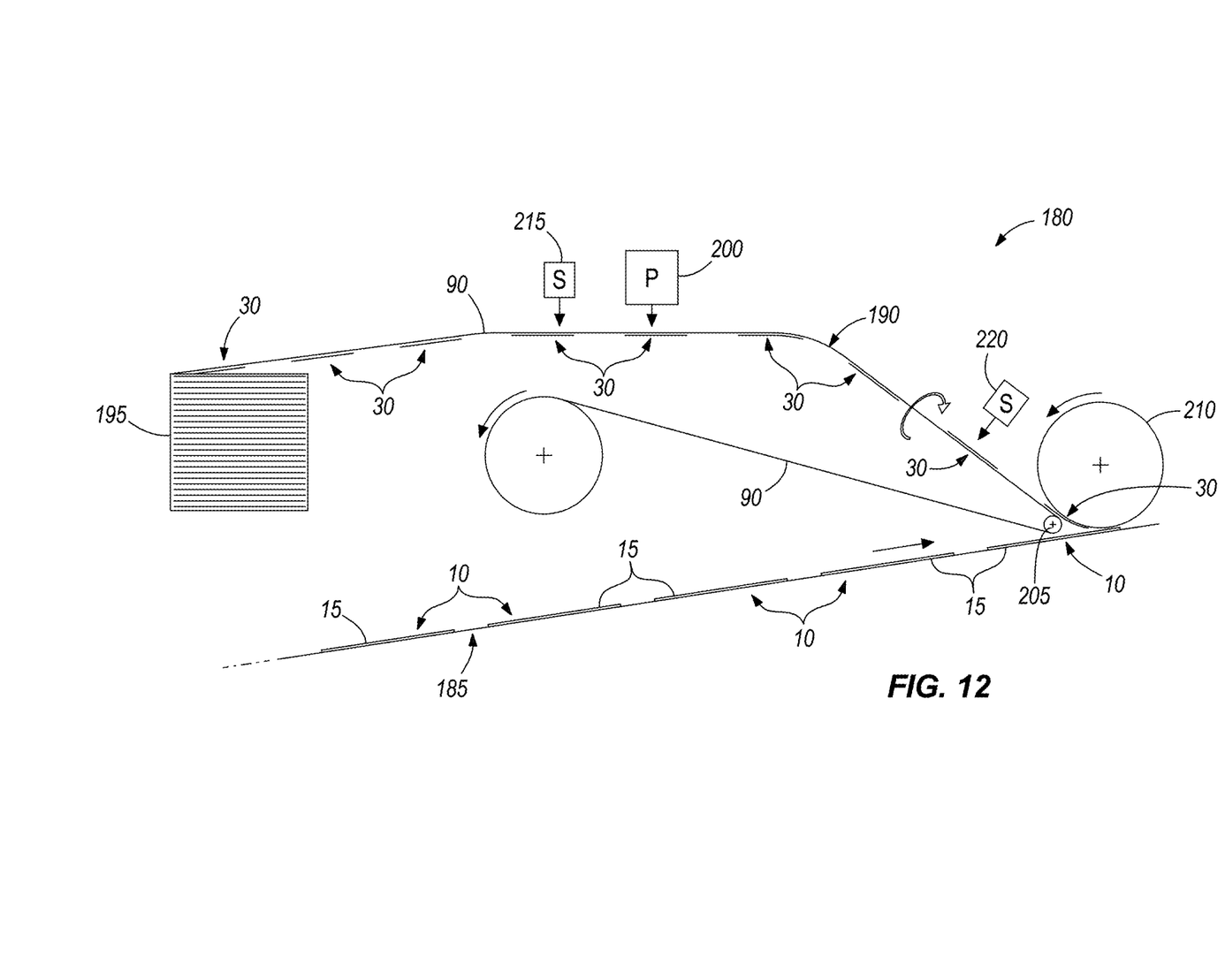
FIG. 12 is a schematic view of one embodiment of a production line for adhering the cards to the printed products.

As shown in FIGS. 1 and 12, at least one of the cards 30 is to be adhered to each of the printed products 10. The printing apparatus 200 is positioned along the second conveyor 190. When one of the cards 30 is aligned with the printing apparatus 200, the master control determines the unique customized/personalized information that is associated with the printed product 10 to which the card 30 will be adhered. The personal bar code 85 including the coded customized/personalized information is printed or otherwise applied on the exposed area on the rear surface 60 of the card 30 (e.g., by applying ink) through the apertures 105, 140 in the backing material 90 and the adhesive layer 110 using the printing apparatus 200.

After printing the personal bar codes 85, the cards 30 continue to travel downstream along the second conveyor 190 toward the first conveyor 185 during which time the stream of cards 30 are turned over with the front surface 55 facing away from the printed products 10. The master control compares the position of the card 30 with respect to the printed product 10 to which the card 30 should be adhered. If necessary, the master control can control the speed and/or position of the first and second conveyors 185, 190 to position the cards 30 and/or printed products 10 to a desired location(s) where the cards 30 can be associated with the desired printed products 10 at the desired locations (i.e., the personal bar code 85 matches the recipient of the printed product 10 and is placed at the right location on the printed product 10).

In the illustrated in-line production applicator 180, the first sensor 215 is not utilized, although in other constructions, the first sensor 215 can be used to sense whether or not the personal bar code 85 was pre-printed on the card 30. For example, the personal bar codes 85 can be pre-printed on each of the cards 30. The cards 30 can be adhered to the backing material 90 with the personal bar codes 85 aligned with the apertures 105, 140 in the backing material 90 and the adhesive layers 110 such that the personal bar codes 85 are exposed from the back side of the backing material 90 and the first sensor 215 can be used to read or scan the personal bar codes 85. In this construction, the master control will associate the scanned personal bar code 85 with an individual's personal information in the database, and then associate that card 30 to the printed product 10 that also includes printed material based upon that individual's personal information. The printing apparatus 200 of the in-line production applicator 180 is not utilized when the personal bar code 85 is pre-printed on the card 30.

To adhere the cards 30 to the proper printed products 10, the cards 30 travel along the second conveyor 190 engage a first roller 205 and a second roller 210. The backing material 90 bends around the first roller 205 such that one of the cards 30 and the respective adhesive layer 110 are removed from the backing material 90. The adhesive layer 110 remains affixed to the rear surface 60 of the card 30. The second roller 210 applies a force to the first surface 55 of the card 30 that pushes the card 30 against the cover 15 of the printed product 10. The adhesive layer 110 firmly affixes and holds the edges of the card 30 to the cover 15. Accordingly, the adhesive layer 110 first used to adhere the card 30 to the backing material 90 is again used to adhere the card 30 to the printed product 10. Each card 30 is removed successively from the backing material 90 and adhered to the respective printed product 10 traveling along the first conveyor 185.

The illustrated method assembles the cards 30 to the exterior surface 25 of the cover (front 15A or back cover 15B) after the printed products 10 are bound. In other constructions, the cards 30 can be adhered to the cover 15 (on an interior or exterior surface thereof) or one of the interior pages 20 prior to or during the binding process. In other constructions, the cards 30 can be adhered to the printed products 10 during an off-line process.

The printed products 10 can be mailed with or without a protective covering or package such as a poly bag, envelope, or poly or paper wrapping even when the cards 30 are adhered to an exterior surface of the cover 15 of the printed products (FIG. 1). The edges of the cards 30 are firmly adhered to the printed product 10 to prevent the card 30 from inadvertent removal and/or interference with mailing operations.

The card 30 is removable from the printed product 10, particularly after mailing the printed product 10. For example, to remove the card 30, the recipient peels the card 30 away from the printed product 10. The illustrated card 30 is cleanly removed from the adhesive layer 110 such that the card is adhesive-free upon removal from the printed product 10. The smooth surface finish of the card 30 assists in allowing clean removal or a "clean release" of the rear surface 60 from the adhesive layer 110, while the adhesive layer 110 remains affixed to the printed product 10.

The information stored in the database (including the personal information and the related personal bar codes 85) can be communicated to the initiating promoter (such as a retailer). The database can be integrated with a network (e.g., a secure network) specific for the retailer such that the retailer can access the database.

When the recipient receives the printed product 10, the recipient typically removes the card 30 (having the personal bar code 85 related to the recipient) from the printed product 10. The recipient presents the card 30 to the retailer, and the retailer reads or scans the personal bar code 85 on the card 30. By scanning the personal bar code 85, the retailer may automatically access and can retrieve the personal information (e.g., name, address, phone number, etc.) of the individual (recipient of the printed product 10) that received and presented the card 30.

Figure 7:
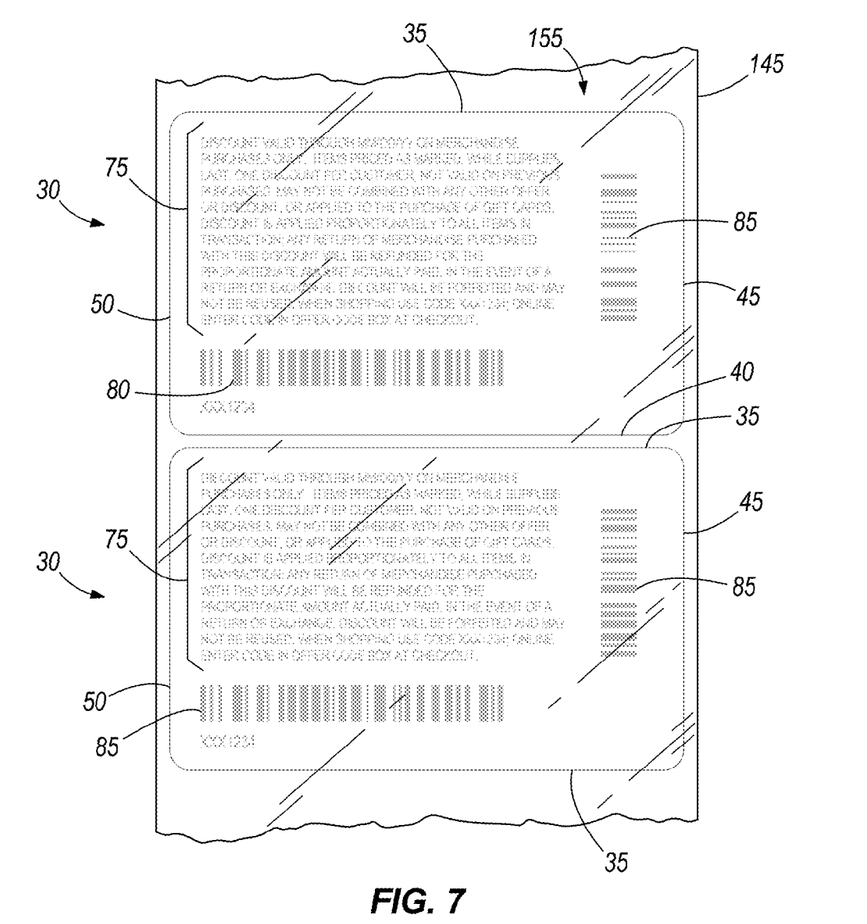
FIG. 7 is a rear view of a plurality of cards adhered to a transparent backing material according to another embodiment of the present invention.
Figure 8:
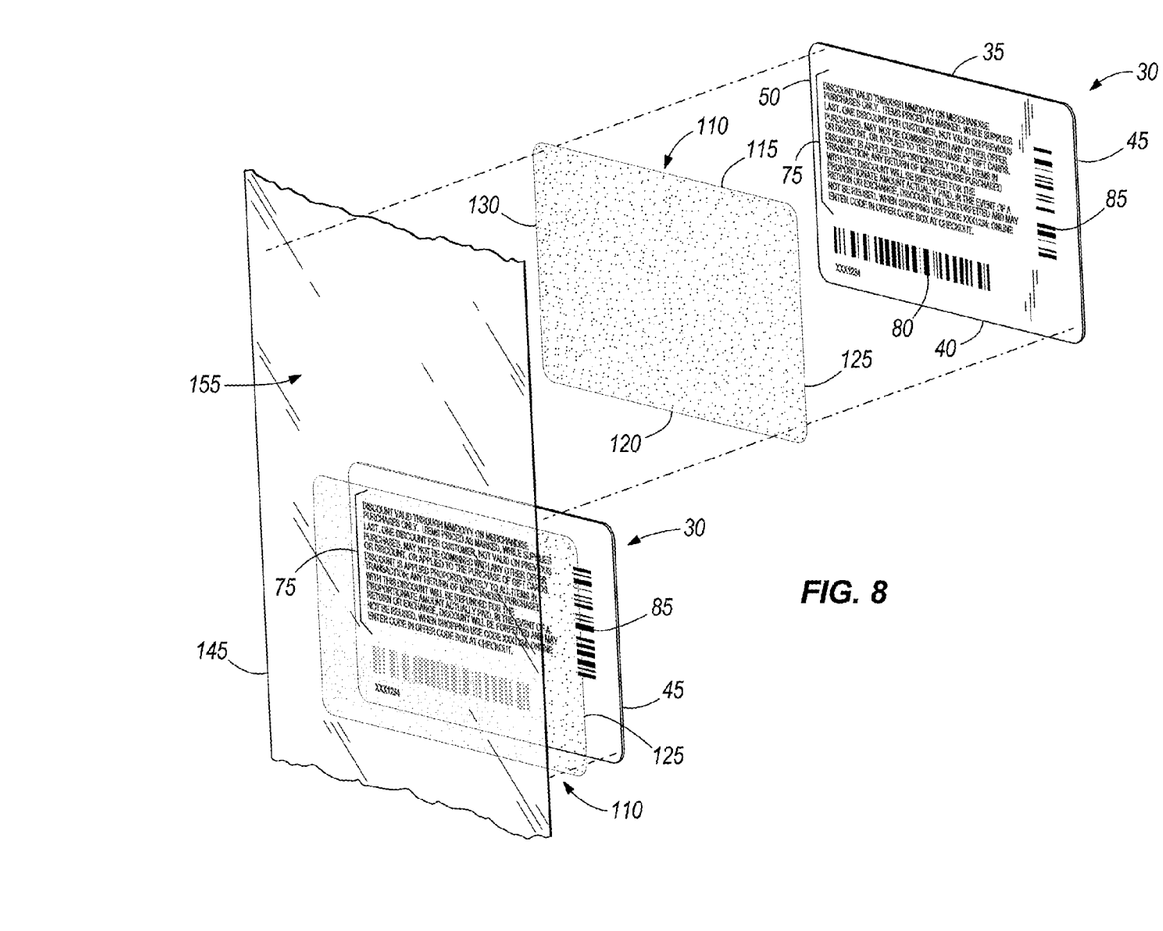
FIG. 8 is an exploded view of the plurality of cards and the backing material shown in FIG. 7.

In other constructions, the backing material 90 can be formed of various materials. For example, FIGS. 7 and 8 illustrate a backing material 145 made of a transparent material. The transparent backing material 145 includes a first surface and a second surface 155 opposite the first surface.

In this construction, the advertising information 75 (FIG. 7), the generic bar code 80, and the appropriate personal bar code 85 can be pre-printed on each of the cards 30 (i.e., printed or otherwise applied prior to being adhered to the backing material 145) such that each of the cards 30 is unique. The personal bar codes 85 and the personal information associated therewith for the particular recipients of the printed products 10 are stored in the database. Each of the cards 30 are adhered to the transparent backing material 145. The illustrated adhesive layer 110 is transparent and substantially covers the rear surface 60 of the card 30. Because the backing material 145 and the adhesive layers 110 are both transparent, all information on the rear surface 60, including unique customized/personalized information, is visible through the backing material 145 and the respective adhesive layer 110 when the cards 30 are adhered to the backing material 145 without the need for any apertures in either of the backing material 145 or the adhesive layers 110. As an alternative to pre-printing cards 30 with personal bar codes 85, each being associated with customized/personalized information at the time it is applied, a unique code or identifier with no associated customized/personalized information may instead be applied. The unique identifier can later be associated with customized/personalized information as desired.

The process for applying the cards 30 of the embodiment of FIGS. 7 and 8 is described with reference to FIG. 12. A stream of cards 30 can be created by drawing the strip of cards 30 from the stack(s) of cards 30 in the case 195. The stream of cards 30 can be transported to the second conveyor 190. As each of the cards 30 travels along the second conveyor 190, the first sensor 215 reads or scans the personal bar codes 85 (pre-printed on the rear surfaces 60 of the cards 30) through the transparent backing material 145 and the transparent adhesive layer 110. The master control is thus able to monitor and ensure the assembly of the cards 30 to the proper printed products 10. The cards 30 with the personalized bar codes or other information can be associated with printed products 10 that are pre-personalized and/or can be used to personalize the printed products 10 based on the known or expected association between the cards 30 and printed products 10. This can be done by using the master control to associate the card 30 with a printed product 10 and control the application of printed information or other printed material to the printed product 10 based on the same personalized information found in the personalized bar code 85 of the card 30. When using the transparent backing material 145, the printing apparatus 200 and the second sensor 220 may not be utilized.

Figure 9:
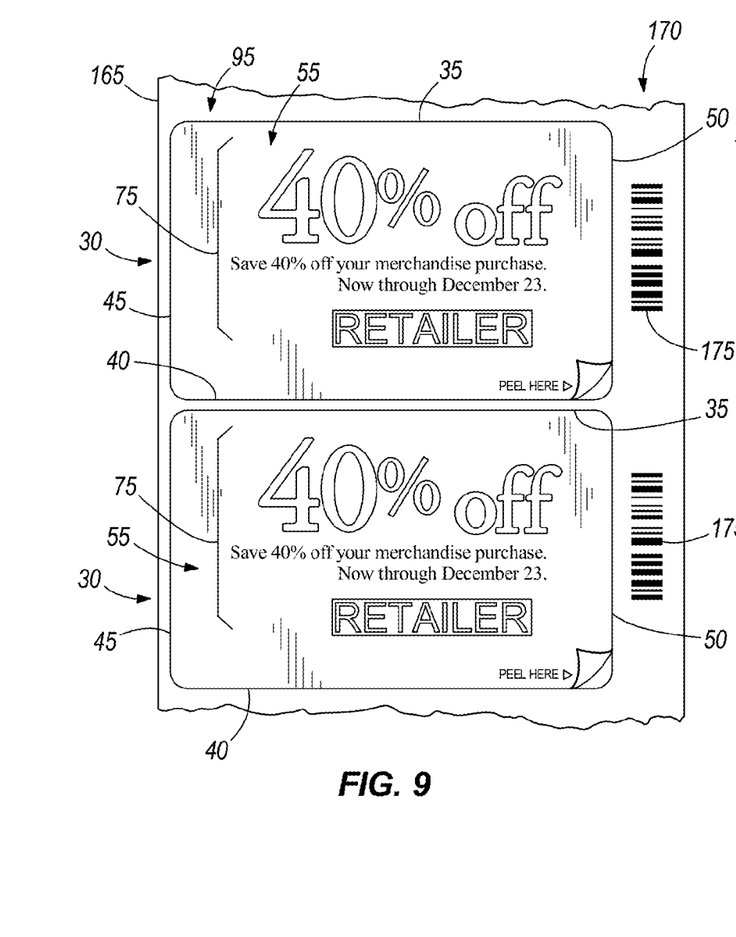
FIG. 9 is a front view of a plurality of cards adhered to a widened backing material according to another embodiment of the present invention.
Figure 10:
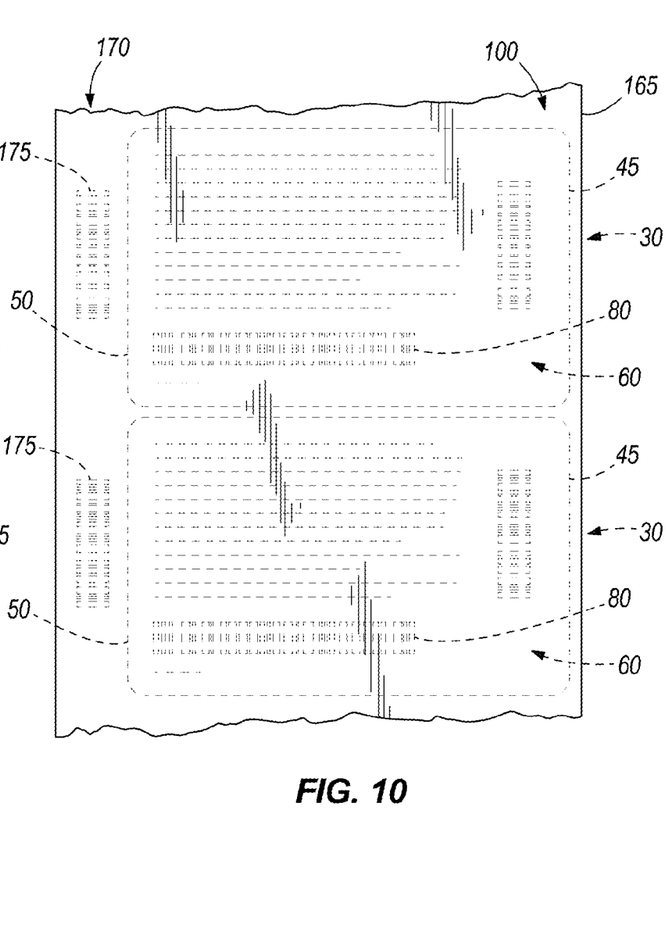
FIG. 10 is a rear view of the plurality of the cards adhered to the backing material shown in FIG. 9.
Figure 11:
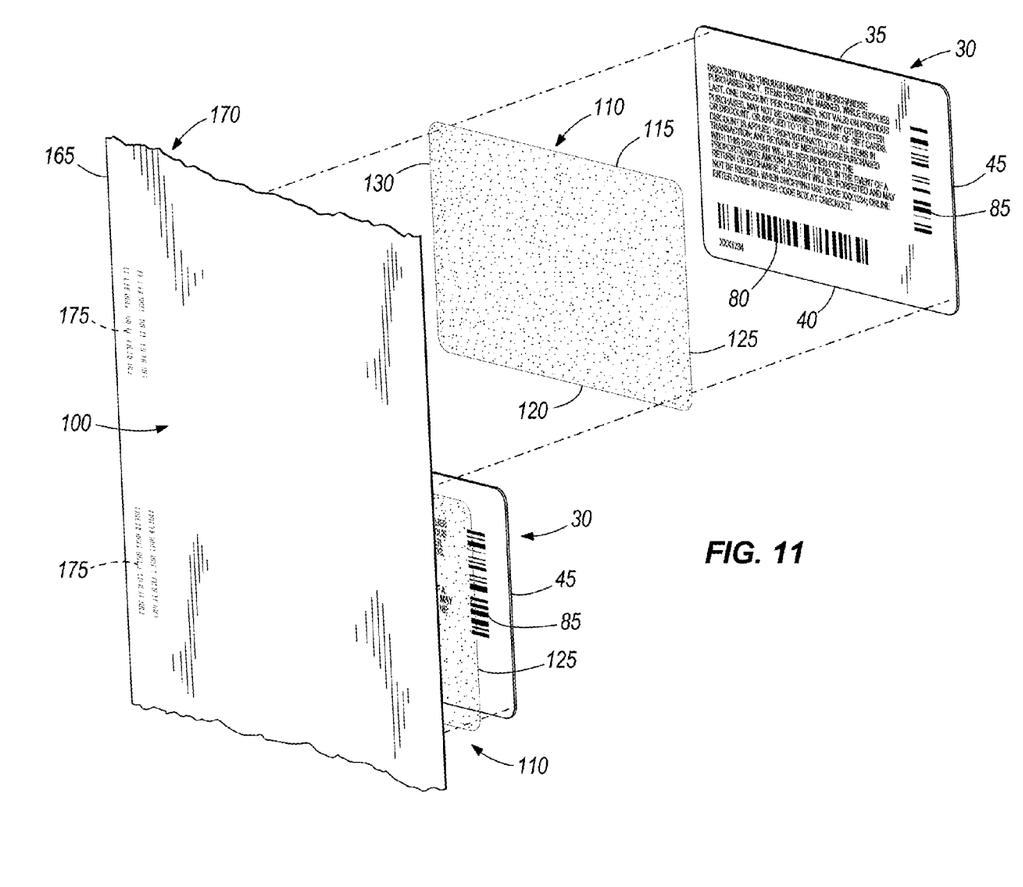
FIG. 11 is an exploded view of the plurality of the cards and the backing material shown in FIG. 9.

In another example, as illustrated in FIGS. 9-11, the cards 30 are adhered to a backing material 165 having a greater width than the backing material 90 shown in FIGS. 4-6 and the backing material 145 shown in FIGS. 7 and 8. The backing material 165 may be made of an opaque material.

With reference to FIGS. 9 and 10, the increased width for the backing material 165 may define an identification portion such as a print portion or tab 170 adjacent to the adhered cards 30 on the first surface 95 of the backing material 165. Each card 30 can be pre-printed (i.e., prior to being adhered to the backing material 165) having a personal bar code 85 on the back surface of the card 30. A personal bar code 175 is also printed on the tab 170 of the backing material 165 proximate each card 30. The personal bar code 175 on the tab 170 can be printed before or after the corresponding pre-printed card 30 is adhered to the backing material 165. In one embodiment, the personal bar code 175 on the tab 170 is identical to the personal bar code 85 on the corresponding card 30, although this may not be required. With reference to FIG. 11, the card 30 is adhered to the backing material 165 by the adhesive layer 110. The adhesive layer 110 substantially covers and affixes to the rear surface 60 of the card 30 such that each edges of the card 30 are adhered firmly adhered to the backing material 165.

The process for applying the cards 30 of the embodiment illustrated in FIGS. 9-11 is described with reference to FIG. 12. The in-line production applicator 180 is used to remove each of the cards 30 from the backing material 165 and adhere the cards 30 to the printed products 10. As the cards 30 travel along the second conveyor 190, the personal bar codes 85 printed on the rear surfaces 60 of the cards 30 are not visible by the first sensor 215, however, the second sensor 220 scans and reads the personal bar codes 175 printed on the front surface 95 of the backing material 165. After the personal bar code 175 is scanned by the sensor 220, the master control can associate the scanned personal bar code 85 with an individual's personal information in the database. The master control may then associate the corresponding card 30 to the printed product 10 and, if desirable, also control processes including printing information or other material to the printed product 10 based upon that individual's personal information. Furthermore, the printed product 10 may contain personalized information at the time when the card 30 and the printed product 10 are associated. Accordingly, the master control can track the cards 30 through production and/or adherence to particular printed products 10.

In an alternative embodiment, an identifier may be placed on each of the cards 30 in advance of the cards 30 being paired with printed products 10. Traditionally, these identifiers (non-limiting examples include bar codes, active or passive tags, numbers, etc.) could not be used to learn information about whether the cards 30 were used by the intended recipients themselves because the cards 30 were not uniquely matched with specific ones of the printed products to be delivered to the intended recipient. As presently described, however, an identifier may be placed on each card 30 (either front or back) in advance of being paired with another product, such as a printed product 10. For example, a third party card manufacturer may produce cards, each having an identifier and those cards can be provided to a printer for association with a printed product to be delivered. The identifier on the card 30 can be read at about the time when the card 30 is to be paired to a printed product 10 so that the identifier can be associated with the intended recipient. A data source (such as the database) includes information on or about each of the intended recipients, including personal information. This may be done, for example, by a mail file that includes mailing and other information for the intended recipients. The data source can be associated with a control system (such as the master control) to control the addressing of the printed products 10 to the intended recipients. By reading the card's identifier when a printed product 10 and a card 30 are associated with one another (for example by a reader, scanner, imaging device, or the like), the identifier can be associated with information on the intended recipient. The data matching the unique identifier with the printed product 10 may be provided to any third party for tracking of the card 30 or other desired uses. The printed product 10 may contain personalized information at the time when the card 30 and the printed product 10 are associated. By associating the identifier on the card 30 with the intended recipient, for example, the use of the card 30 by the intended recipient can be identified at the point-of-use or later to log the response of the intended recipient with respect to the particular offering of the card 30. Further, by using identifiers and associating each card's identifier with an intended recipient, the need to specially print personal bar codes or other personal identifiers on the card 30 can be eliminated. Moreover, any card can be used and be placed on the printed product off-line or in-line for placement on either the cover or the interior of the printed product 10. In other embodiments, the identifier may be placed on other printed materials or products including, for example, coupons, inserts, off-serts, etc. that are produced in off-line or in-line processes.

What is claimed is:

1. A method of personalizing a clean release card and adhering the clean release card to a printed product, the method comprising:
   providing the clean release card having a rear surface adhered to a backing material with an adhesive layer;
   applying coded personal information for an individual on the rear surface of the clean release card;
   printing personal information for the individual on the printed product; and
   transferring the clean release card and the adhesive layer from the backing material to the printed product, and adhering the rear surface of the clean release card to the printed product with the adhesive layer.

2. The method of claim 1, wherein the coded personal information is provided as machine readable indicia.

3. The method of claim 2, wherein the machine readable indicia is a bar code.

4. The method of claim 1, wherein the adhesive layer is substantially the same size as the clean release card.

5. The method of claim 1, wherein adhering the rear surface of the clean release card comprises adhering the clean release card to the outside of a cover of the printed product with the adhesive layer having peripheral edges that match peripheral edges of the clean release card.

6. The method of claim 1, wherein applying coded personal information for an individual on the rear surface of the clean release card comprises printing the coded personal information onto an exposed area of the rear surface of the clean release card through an aperture in the backing material prior to the rear surface of the clean release card being adhered to the printed product.

7. A method comprising:
providing a card having a rear surface adhered to a backing material with an adhesive layer;
applying coded personal information for an individual on a rear surface of the card;
printing personal information for the individual on a printed product;
transferring the card and the adhesive layer from the backing material to the printed product, and releasably adhering the rear surface of the card to an exterior surface of the printed product with the adhesive layer, the rear surface of the card being cleanly releasable from the adhesive layer; and
mailing the printed product without protective packaging covering the card.

8. The method of claim 7, wherein the coded personal information is provided as machine readable indicia.

9. The method of claim 8, wherein the machine readable indicia is a bar code.

10. The method of claim 7, wherein the adhesive layer has peripheral edges that match peripheral edges of the card.

11. The method of claim 7, wherein applying coded personal information for an individual on the rear surface of the card comprises printing the coded personal information onto an exposed area of the rear surface of the card through an aperture in the backing material prior to the rear surface of the card being adhered to the printed product.

12. A method of associating cards of a stream of unique cards to printed products of a stream of printed products on one of a printing line and a finishing line, the method comprising:
conveying a stream of unique cards to a stream of printed products on one of a printing line and a finishing line, each card of the stream of unique cards including information on a rear surface thereof that corresponds to personal information specific to an intended recipient of a corresponding one of the printed products, the rear surface of each of the cards of the stream of unique cards being releasably adhered to a common backing material;
separating a first card of the stream of unique cards from the backing material; and
adhering the first card of the stream of unique cards to a corresponding printed product of the stream of printed products.

13. The method of claim 12, wherein the information on the rear surface of each card of the stream of unique cards is coded personal information for the intended recipient that is machine readable.

14. The method of claim 13, wherein the machine readable coded personal information is in the form of a bar code.

15. The method of claim 13, further comprising printing the coded personal information on the rear surface of the first card through an aperture in the backing material while the first card is adhered to the backing material prior to the first card being adhered to the corresponding printed product.

16. The method of claim 13, further comprising scanning the coded personal information from the rear surface of the first card while the first card is adhered to the backing material.

17. The method of claim 16, wherein scanning the coded personal information from the rear surface of the first card includes scanning the coded personal information through an aperture in the backing material.

18. The method of claim 16, wherein the backing material is transparent, and wherein scanning the coded personal information from the rear surface of the first card includes scanning the coded personal information through the transparent backing material.

19. The method of claim 13, further comprising scanning coded personal information corresponding to the coded personal information on the back surface of the first card from the backing material.

20. The method of claim 13, further comprising associating the information on the rear surface of each card of the stream of unique cards with the personal information on the printing line or finishing line.

21. The method of claim 13, further comprising providing each card to the printing line or finishing line with the information on the rear surface thereof already associated with the personal information prior to conveying the stream of unique cards to the stream of printed products.

* * * * *